May 30, 1944.  J. BUCHHART  2,349,937
AUTOMATIC TRANSMISSION
Filed July 19, 1939  2 Sheets-Sheet 1
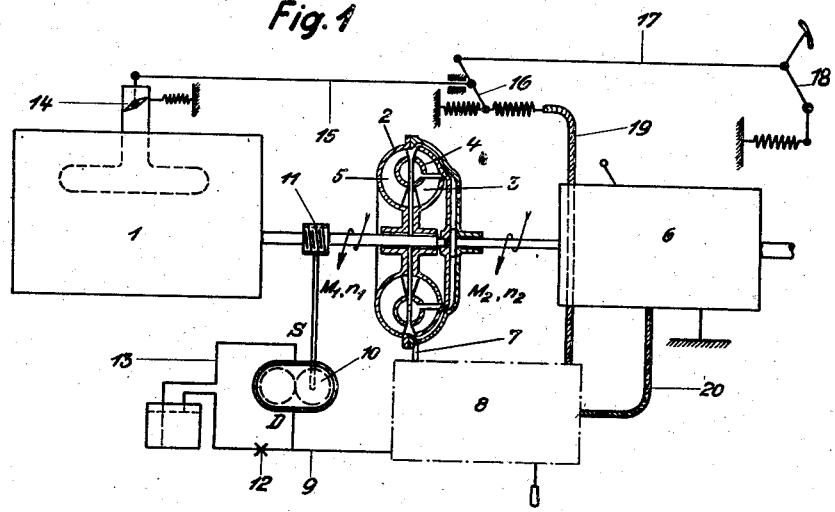
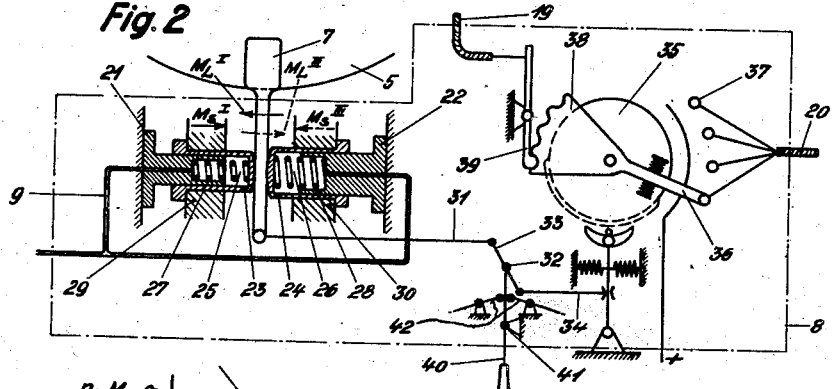
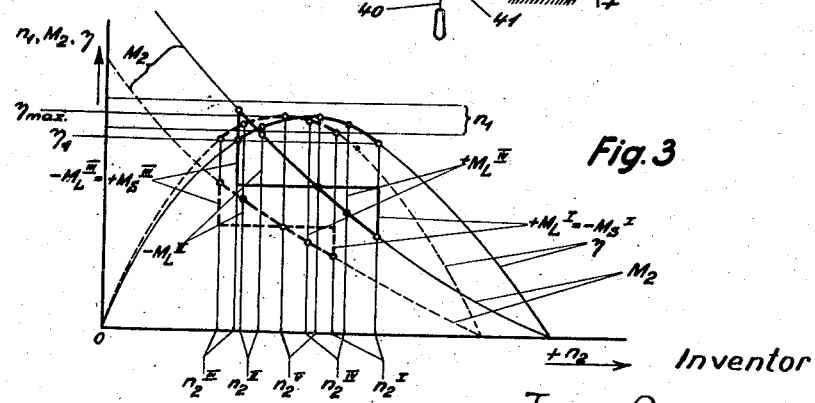
Inventor
JOSEF BUCHHART
By
Attorneys May 30, 1944.    J. BUCHHART    2,349,937
AUTOMATIC TRANSMISSION
Filed July 19, 1939    2 Sheets-Sheet 2
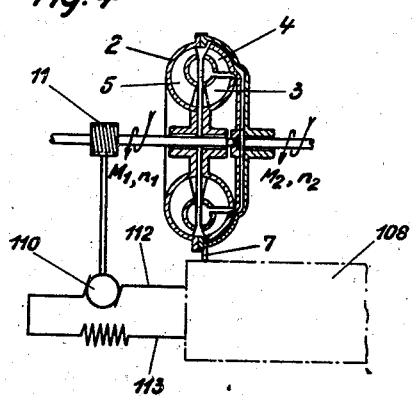
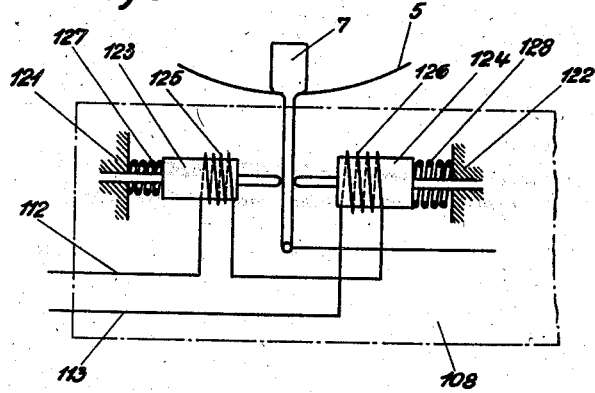
INVENTOR
JOSEF BUCHHART
BY
ATTORNEYS Patented May 30, 1944

2,349,937

UNITED STATES PATENT OFFICE 2,349,937

AUTOMATIC TRANSMISSION

Josef Buchhart, Stuttgart-Zuffenhausen, Germany; vested in the Alien Property Custodian Application July 19, 1939, Serial No. 285,330
In Germany July 22, 1938

8 Claims. (Cl. 74—189.5)

This invention relates to an automatic transmission, and more particularly to an arrangement for automatically shifting a speed-change gear in response to the reaction torque developed in an intermediate torque converter.

An object of this invention is to provide a novel, simple automatic transmission system.

Another object of this invention is the provision of an automatic transmission system wherein means are provided for automatically shifting a speed-change gear in response to the torque on the reaction member of an intermediate torque converter.

Still another object of this invention is the combination of a fluid drive and speed-change gear, wherein said gear will be automatically shifted to maintain the fluid drive at its maximum efficiency for varying conditions of load and speed.

A further object of this invention is the provision of an improved transmission consisting of hydro-kinetic torque converter and speed-change drive, wherein the speed changes are produced automatically in response to the torque on the reaction member of the torque converter.

Further objects and advantages of this invention will be apparent from consideration of the specification as illustrated by the accompanying drawings of possible embodiments of the invention in which drawings:

Fig. 1 is a schematic drawing of a preferred form of a complete power plant arranged in accordance with this invention;

Fig. 2 is an enlarged view of the automatic transmission control device diagrammatically portrayed in Fig. 1;

Fig. 3 is a diagram illustrating the characteristics and operation of the transmission system;

Fig. 4 is a partially diagrammatic view of a modified arrangement of the system illustrated in Fig. 1, and Fig. 5 is an enlarged view illustrating certain details of the modified system portrayed in Fig. 4.

A preferred form of this invention is schematically illustrated in Fig. 1 which shows a prime mover 1, which may be an internal combustion engine, drivably connected to a torque converter 2 of the hydro-kinetic type having an impeller 3, a turbine 4 and a reaction member 5, and thence to a speed-change drive generally indicated at 6. This power system is particularly adapted for use with a vehicle, such as a motor or railway vehicle, but obviously is not limited to use in this connection alone.

The reaction member 5 of the hydro-kinetic torque converter 2 is preferably provided with an extended crank arm 7 which cooperates with a control device 8 for the control of the automatic speed-change 6.

A conduit 9 leading to the transmission control device 8 for a purpose hereinafter described is connected to the pressure side D of a pump, here shown as a gear pump 10, drivably connected through the worm 11 with the impeller 3. A throttle 12 is preferably provided between the pressure side D of the pump 10 and the sump, while a conduit 13 supplies fluid to the pressure side S of the pump 10.

The speed of the internal combustion engine serving as the prime mover 1 is adapted to be controlled by a throttling vane 14 in the fuel supply, which is interconnected through link rod 15, crank 16 and link rod 17 with the usual foot pedal 18. Additional control of the throttling vane 14 is also effected by the Bowden wire control device 19 connected to the opposite end of the crank 16 from the link rod 17 for a purpose to be hereinafter described. The wire 19 leads to the control device 8 (shown more fully in Fig. 2), which is also interconnected with the transmission 6 by means of the control cable 20. While the transmission 6 may be of any well known remote controlled type, it is preferably electrically controlled in a manner well known to the art and the connecting cable 20 may then contain the control wires for the electric transmission control device.

Referring more particularly to Fig. 2, the construction and operation of the control device 8 interconnecting the reaction member of the torque converter for control of the automatic speed-change drive 6 will now be described with more particularity. In order to resist and oppose the torque on the reaction wheel 5, the crank arm 7 connected thereto is preferably movable between two piston drives 21 and 22 which include movable pistons 23 and 24 respectively, having respective hollow pressure spaces 25 and 26 to which a fluid under pressure is supplied from the pump 10 through conduit 9. The pistons 23 and 24 are additionally urged against the crank arm 7 by suitable means such as internal helical springs 27 and 28. It will thus be seen that the crank arm 7 is movable in either direction between the piston abutments 29 and 30, depending upon the direction and amount of the reaction torque upon the reaction wheel 5, as compared with the abutting force produced by the pistons 23 and 24 through the springs 27 and 28 and the internal fluid pressure which, in turn, is dependent upon the speed of the pump 10 drivably connected with the impeller 3.

For controlling movement of the automatic transmission 6 by the movement of the crank arm 7, a link rod 31 may be pivotally connected to the far end of the crank 7 and at its other end to a two-armed lever 33 shown as pivotally movable about a point 32. A second link rod 34 pivotally connected at the other end of the two-armed lever 33 actuates a double pawl and ratchet mechanism actuating a rotatable member 35 upon which is resiliently mounted a switch contacting arm 36. Through this arrangement, movement of the crank lever 7 in one direction or the other will move the contact arm 36 from one contact 37 to another contact which will then electrically actuate the various changes in the transmission 6, in a manner well known to the art.

The switch arm 36 is also preferably provided at its opposite end with a notched section 38 against which one end of a pivoted two-armed lever 39 is sprung, the other end of this lever being attached to the wire 19, connected as above described with the throttling vane 14 of the engine 1. The notches are so correlated with the contact 37 that while the switch arm 36 rests upon a contact, the wire 19 will be in a normal position which does not affect the position of the throttling vane 14. However, intermediate the contact 37 the notched section 38 will raise the end of the lever 39 pressing against it to move the wire 19 in such a direction that through the crank 16 and the link rod 15 the throttling vane 14 will be moved to its idling position. Thus, during the switching step, power is removed from the torque converter which not only assures a quick positive switching movement, but additionally permits the use of any type of clutching means in the automatic transmission, such as a direct-driving or dog clutch.

It is to be noted that the pivot 32 for the linkage system interconnecting the crank arm with the switch for the automatic transmission 6 is mounted upon a hand lever 40, pivoted at 41 and held in place by temporary stops 42, so that in this case the pivot 32 is fixed. If it is desired to remove the control of the automatic transmission from the crank arm, the hand lever 40 may be disengaged from the temporary stops 42 by swinging them into the position indicated in dash lines, whereupon the pivot point 32 may be moved as desired by the lever 40 and thereby move the switch arm 36 in either direction at will. This arrangement is of particular importance when it is desired to use the engine as a brake, in which case the transmission may be moved through the hand lever to a lower driving step. By restoring the hand lever 40 and the pivot point 32 to their original positions, automatic control of the transmission is instantly reinstated.

By reference to Figs. 1, 2 and 3, the operation of the above-described system will now be set forth. In order to clarify the sequential operation, the various torques and forces arising have been given particular designations. The torque of the impeller 3 may be designated as $M_1$, while the speed of this member has been designated as $n_1$. Except during starting and during the time the engine is idling through control of the throttling vane 14, both $M_1$ and $n_1$ remain substantially constant. The torque and speed of the turbine member have been correspondingly respectively designated as $M_2$ and $n_2$. Fig. 3 illustrates the manner in which $M_2$ will vary with increasing $n_2$ while at the same time $n_1$ will remain substantially constant. Fig. 3 has been plotted to show the variations of $M_2$ with increasing $n_2$ for both full throttle of the driving motor (solid lines) and partial throttle of the same (dash lines). The efficiency of the torque converter 2 is at its maximum when the transmission ratio is approximately 1:1. This efficiency varies during increasing speed $n_2$ of the turbine element 4 as has been indicated in Fig. 3, wherein such efficiency is designated as $\eta$.

During initial starting of the engine the torque $M_1$ of the impeller 3 will be relatively small, that upon the stationary turbine element 4 ($M_2$) very large, and the torque upon the reaction member 5 which may be designated as $M_L$ will be correspondingly large, resolving itself into a force $M_L^{III}$ as shown in Fig. 2. This force $M_L^{III}$ will be so large, and the opposing reaction force $M_S^{III}$ so small due to the low pressure resulting from slow speed $n_1$ of the impeller 3, that the crank arm will move toward the right, as seen in Fig. 2 to hold the switch arm 36 in the lowest driving connection. As the engine comes up to speed $n_1$ will soon reach a constant value as will the impeller torque $M_1$. At the same time, the pressure within the reaction piston will also increase. During this period $n_2$ will be increasing while $M_2$, as seen in Fig. 3 will decrease. Shortly a point will be reached at which $M_2$ will be less than $M_1$ which will then result in a torque on the reaction member 5 acting in the opposite direction and indicated in Figs. 2 and 3 as $M_L^I$. As $n_2$ increases to provide a slight overdrive, $M_L^I$ will have increased to such a degree as to overcome the reaction force $M_S^I$ and moves the crank arm 7 to the left. As shown in Fig. 3, this may occur at the turbine rotor speed $n_2^I$.

As soon as the switch arm 36 moves to the next higher step and the transmission 6 is placed in a higher gear, the torque $M_2$ will greatly increase over its previous value, and, to be sure, to such an extent that the torque upon the reaction wheel 5 may reverse and produce a force against the abutment indicated by $M_L^{II}$. This reversed force will not, however, be sufficient to overcome the opposing force of the abutment $M_S^{III}$ and the crank arm 7 will accordingly not move sufficiently to the right to cause a reversed action of the switch mechanism. After the transmission has moved to the higher step, the speed of the turbine wheel 4 will be approximately $n_2^{II}$ as indicated in Fig. 3. This speed will then gradually increase again and switching to additional higher speed will occur in substantially the same manner as described above for switching from the first to the second speed, until the highest step in the transmission has been reached.

If the vehicle is ascending a hill, or for any reasons whatsoever the load thereon is greatly increased, the speed of the vehicle and thus that of the turbine wheel 4 will be reduced thus increasing the torque $M_2$. When the speed has been reduced to a point such as $n_2^{III}$ as indicated in Fig. 3 the torque on the reaction member 5 will be of such a value $M_L^{III}$ that it will act in such a direction and have sufficient value to move the crank arm 7 to the right against the reaction force $M_S^{III}$ to move the link rod 34 to the left, as seen in Fig. 2, thus switching the transmission from a higher to a lower gear. This change in transmission ratio will immediately decrease the torque $M_2$ while the speed of the turbine member 4 will increase to $n_2^{IV}$ and produce a reverse force $M_L^{IV}$ acting against the reaction force $M_S^I$. $M_L^{IV}$ is, however, less than $M_S^I$ and the crank arm cannot therefore continue moving to the left to again actuate the transmission to a higher step to nullify the previous reduction.

If the previously described reduction in transmission ratio is not sufficient the apparatus will operate to reduce the drive until the lowest step has been reached.

In all cases between steps, due to the action of the notched sector 38 moving the wire 19, the engine speed will be reduced. This removes the additional pressure from the pistons 23 and 24 and thus assures a quick positive movement of the crank arm providing, in turn, a quick positive movement of the switch arm 36. In this manner oscillation and "hunting" of the crank arm 7 are avoided.

It is to be particularly noted in connection with the operating curves illustrated in Fig. 3 that the maximum efficiency of the converter will occur approximately when the turbine element 4 has a speed $n_2{}^V$. The apparatus is so designed, however, that the range of speed covered by each transmission step are such that the efficiency never falls below $\eta_1$, which is not far from $\eta_{max}$. This is true not only for full throttle of the prime mover, but also is true for partial loading.

As a further important modification of the construction described above, it is possible that other means than the pump and pressure-operated pistons may be used to supply the reaction force opposing movement of the crank arm 7 attached to the reaction member 5. Such an alternate arrangement has been illustrated in Figs. 4 and 5, where a generator 110 suitably geared to impeller 3 may supply current proportionate to the speed of the impeller through conductors 112 and 113 to electromagnet windings 125 and 126 which control respective armatures 123 and 124. The stationary members 121 and 122 serve in this case as guides for the armatures and as abutment for springs 127 and 128 pressing against the armatures 123 and 124 respectively. In this case the control device as a whole and as so modified has been designated as 108. It is obvious that the operation of the system illustrated in Figs. 4 and 5 will produce proportionately the same results as that illustrated in Figs. 1 and 2.

While the principles of this invention are particularly applicable to the transmission of power for an automotive vehicle, it is obvious that its use may be extended to other vehicles, such as, for example, to the driving of railway vehicles, tractors, ships, elevators, etc. The exact type of prime mover is without importance. Furthermore, it is contemplated that other types of torque converters than the hydro-kinetic torque converter illustrated may be used. For example, an hydraulic converter of the displacement type could be utilized, as could be mechanical and electrical torque converters. In all cases, however, in accordance with the principles of this invention, the automatic transmission would be controlled by the torque produced upon the reaction member.

It will therefore be understood that this invention is not intended to be limited to the forms specifically described and illustrated, but is capable of many further modifications within the knowledge of those skilled in the art without departing from the invention as defined by a proper interpretation of the following claims.

I claim:

1. In combination, a prime mover, a change-speed drive having a plurality of predetermined driving ratios, a torque converter drivably connecting said prime mover with said change-speed drive, said converter having a driver element connected to said prime mover, a driven element connected to said change-speed drive, and a reaction member, control means responsive to the torque on said reaction member for actuating said change-speed drive to change the speed to a higher ratio upon a decrease in the torque load of the driven element below a predetermined minimum, and to change the speed to a lower ratio upon an increase in the torque load of the driven element above a predetermined maximum, said control means being ineffective to cause a change in said change-speed drive at that torque on the reaction member corresponding to the maximum transmission efficiency of said converter, and means for disabling said control means from actuation by said reaction member and permitting control of said change-speed drive at will.

2. In combination, a prime mover, a change-speed drive having a plurality of predetermined driving ratios, a hydraulic torque converter drivably connecting said prime mover with said change-speed drive, said converter having a driver element connected to said prime mover, a driven element connected to said change-speed drive, and a reaction member having a crank arm, control means actuated by said crank arm for changing the ratio of said change-speed drive, a pump coupled with said driver element, pistons abutting on opposite sides of said crank arm, and conduits leading from said pump to said piston for supplying pressure opposing movement of said crank arm.

3. The combination according to claim 2, in which said torque converter is hydro-kinetically operated, said driver element is an impeller, and said driven element is a turbine.

4. In combination, a prime mover, a change-speed drive having a plurality of predetermined driving ratios, a hydraulic torque converter drivably connecting said prime mover with said change-speed drive, said converter having a driver element connected to said prime mover, a driven element connected to said change-speed drive, and a reaction member having a crank arm, control means actuated by said crank arm for changing the ratio of said change-speed drive, a generator coupled with said driver element, and electromagnets electrically connected to said generator and mounted on opposite sides of said crank arm to oppose movement thereof.

5. In combination, a prime mover, a step-by-step change-speed drive, hydro-kinetic torque converter drivably connecting said prime mover with said change-speed drive, said converter having an impeller connected to said prime mover, a turbine element connected to said change-speed drive, and a reaction member having an extending crank arm, a pair of movable abutments on opposite sides of said crank arm, springs for pressing said abutment against said crank arm, means responsive to the speed of said impeller for supplementing the force of said spring, a control arm for changing the ratio of said change-speed drive, a double pawl and ratchets for moving said control arm in opposite directions, and linkage means interconnecting said double pawl for actuation by said crank arm.

6. The combination according to claim 5, in which said speed-responsive means includes a pump coupled to said impeller, a pair of hollow movable pistons abutting against said crank arm, a source of fluid, and conduits for supplying said fluid under pressure from said pump to said hollow piston.

7. The combination according to claim 5, in which said speed-responsive means includes a generator coupled to said impeller, a pair of electromagnets having their respective armatures abutting said crank arm, and means for connecting said electromagnets for energization by said generator.

8. The combination according to claim 5, in combination with speed-control means for said prime mover including an idling position, and means responsive to movement of said control arm between changes of said change-speed drive for moving said speed-control means to said idling position.

JOSEF BUCHHART.